United States Patent [19]

Williams

[11] 4,453,337
[45] Jun. 12, 1984

[54] RODENT FEED STATION

[75] Inventor: Charles G. D. Williams, Rolling Hills Estates, Calif.

[73] Assignee: Environmentally Safe Products, Corp., Torrance, Calif.

[21] Appl. No.: 407,657

[22] Filed: Aug. 12, 1982

[51] Int. Cl.³ .......................................... A01M 25/00
[52] U.S. Cl. .................................. 43/131; 119/51 R; 119/52 R
[58] Field of Search .................. 43/131; 220/300, 301, 220/298; 222/206, 215; 119/18, 17, 51 R, 52 R

[56] References Cited

U.S. PATENT DOCUMENTS

| 1,309,606 | 7/1919 | Bartholomew | 43/131 |
| 2,683,326 | 7/1954 | Gardner et al. | 43/131 |
| 2,944,364 | 7/1960 | Kelly | 119/52 R |
| 3,008,262 | 11/1961 | Ronicker | 43/131 |
| 3,303,600 | 2/1967 | Freeman | 43/131 |
| 3,488,879 | 1/1970 | Laughlin | 43/131 |
| 4,026,064 | 5/1977 | Baker | 43/131 |
| 4,161,079 | 7/1979 | Hill | 43/131 |
| 4,228,613 | 10/1980 | Kalnasy | 43/131 |

Primary Examiner—Nicholas P. Godici
Assistant Examiner—Thomas S. Mieczkowski
Attorney, Agent, or Firm—Knobbe, Martens, Olson & Bear

[57] ABSTRACT

The feed station is a generally rectangular housing forming an enclosure containing a separate bait cup which cooperates with walls of the enclosure to form an inexpensive disposable product. The housing has a pair of initially covered holes which permit the rodent to enter the housing and travel to an opening offset from the holes which provides access to the bait cup. A screen confines bait pellets within the cup, but it is breakable by the rodent. A dispenser on the wall of the housing provides fluid to freshen the bait.

16 Claims, 6 Drawing Figures

U.S. Patent  Jun. 12, 1984  Sheet 1 of 3  4,453,337
Fig. 1
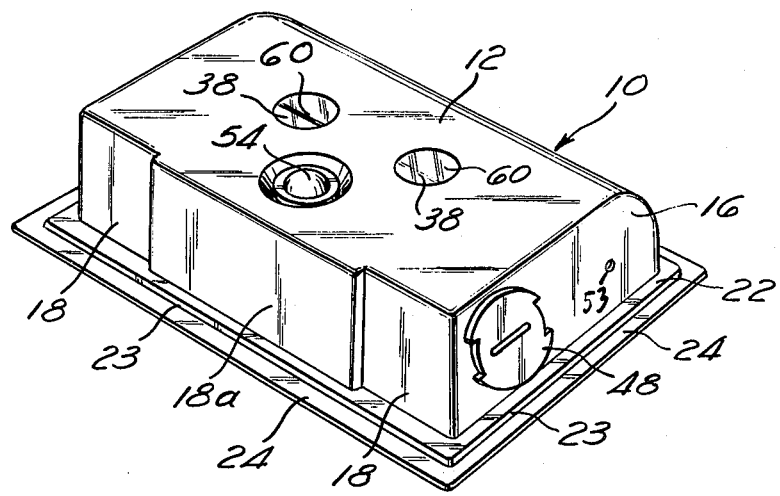
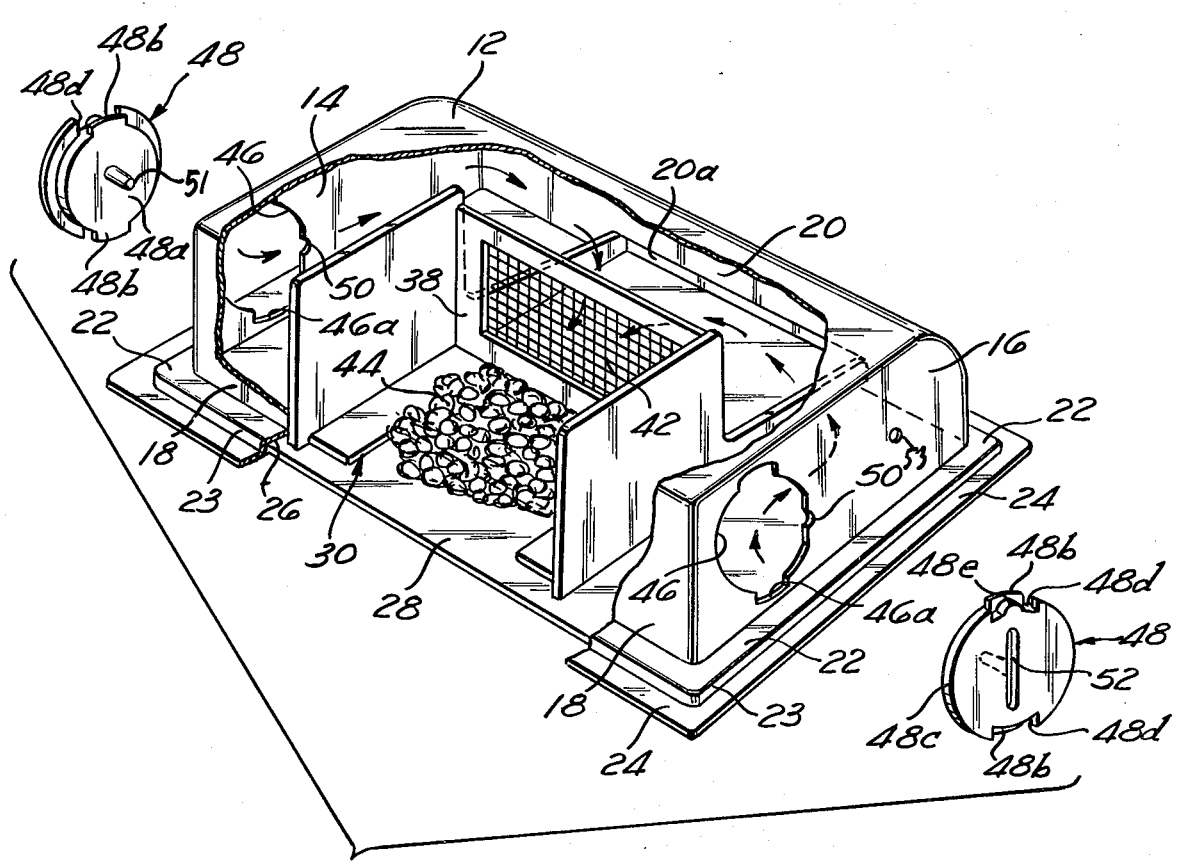
Fig. 2

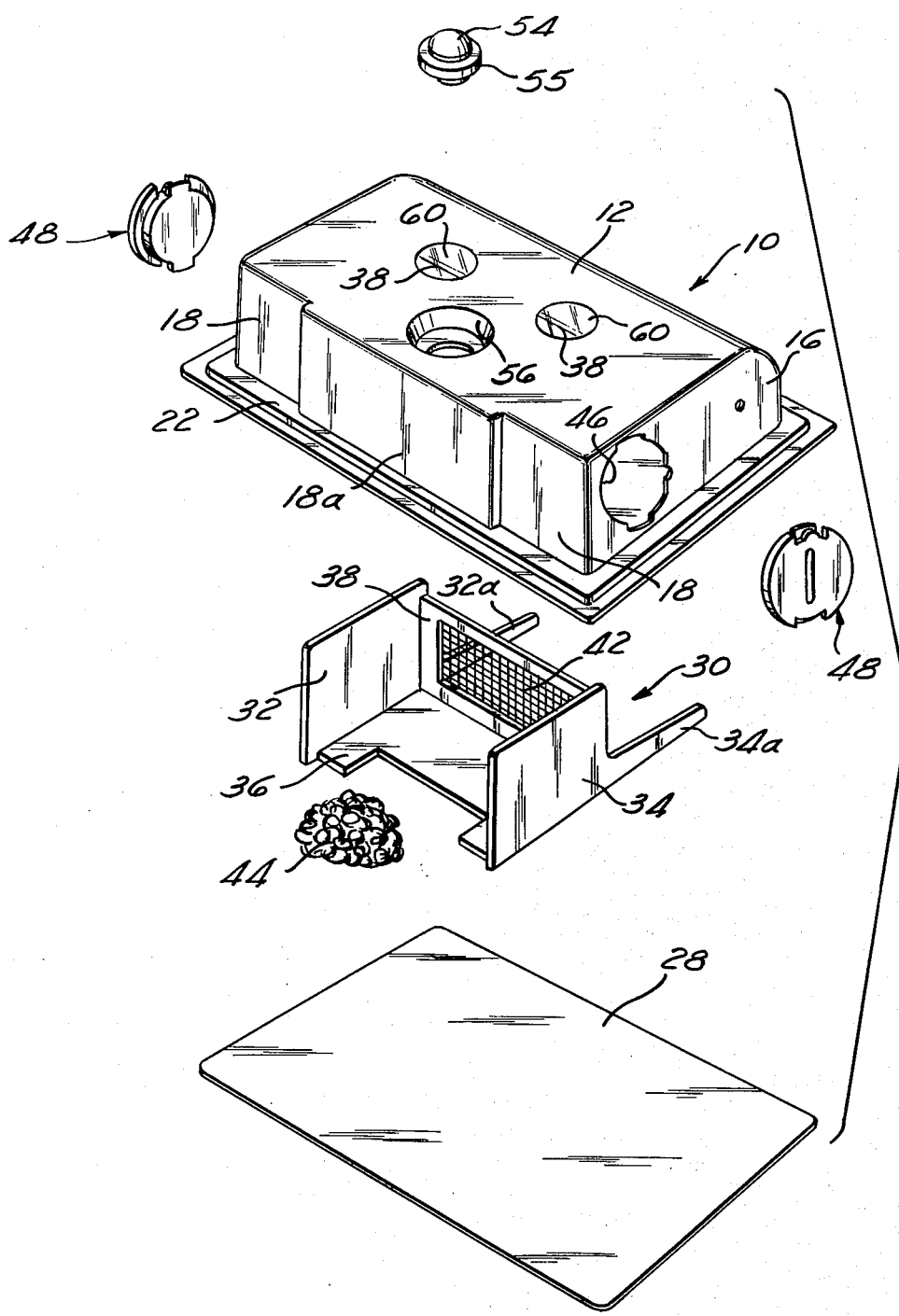
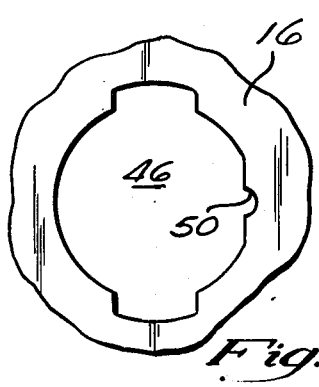
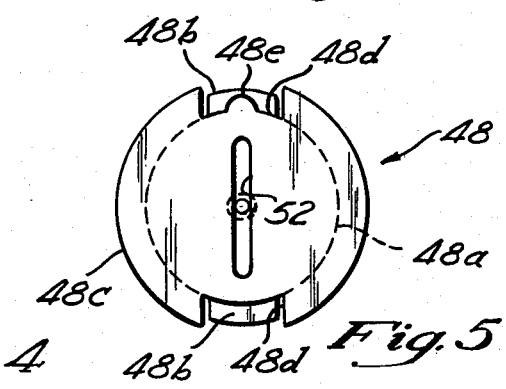
Fig. 3
Fig. 4
Fig. 5

RODENT FEED STATION

This invention relates to rodent bait containers, particularly a low-cost, disposable rodent feed station that is safe and convenient in handling and use.

The problem of rodent control is never ending. A commonly used method of dealing with heavy infestations of mice or rats is to distribute in the infested area poison or other substance which will cause the rodent to die. The Environmental Protection Agency of the United States Federal Government has considered establishing safety guidelines for the manufacture of rodent bait stations. One of the requirements is that the bait be kept in a tamper-proof box made of material which is impervious to weather and strong enough to prohibit entry by non-target species. Entrance must allow easy access for the target species, but yet prohibit access to bait by larger, non-target species. This can be accomplished by limiting entrance sizes, by using baffles, and/or by incorporating a maze-like construction. Further, the box must have some internal structure containing the bait so that the bait will not be directly exposed to non-target animals from outside the box.

Some products are known which generally meet these requirements. U.S. Pat. Nos. 4,228,613, 4,026,064, 3,488,879, and 3,008,262 disclose examples of such products. Most of these devices are relatively expensive or are commercial products used by professional pest control businesses. These devices have the serious disadvantage that the toxic bait must be added by the user when the device is to be used. They are also mostly reusable devices which thus require periodic servicing to replenish the bait. While this is not an exceptionally difficult task for trained personnel, it is an unpleasant and somewhat dangerous chore for non-professionals, such as a homeowner or other individual having a pest control problem but not having sufficiently severe problems to justify the expense of employing a professional. The task of servicing a rodent bait station must be done with care and with adequate safety precautions in view of the toxic nature of the bait which is normally employed. Thus, a need exists for a rodent bait station which will meet governmental safety regulations and can be purchased and used with safety by an ordinary consumer. The device must of course be effective in eliminating the target species and it must be simple to use and sufficiently inexpensive to be practically disposable so as to eliminate handling of toxic bait materials.

SUMMARY OF THE INVENTION

In accordance with the present invention, a bait feed station is provided which includes a bait cup preferably made of plastic which simply fits within grooves or recesses formed within walls of an inexpensive plastic housing having an upper wall and a plurality of depending side walls. The housing is then closed by a flat sheet which forms the bottom wall and holds the bait cup in proper position within the housing recesses.

The housing has one or more holes for access to the interior of the housing by target species, such holes being initially closed by readily movable but tamper-proof doors. The bait cup is provided with an opening for access by the rodent to the bait, such opening being offset with respect to an entry hole in the housing wall so that a child or pet cannot easily have access to the bait. The opening to the bait cup is preferably covered by a screen which is strong enough to confine solid bait positioned within the bait cup, but is made of material which can be easily chewed away or broken by the rodent. This ensures that the bait cannot fall or be shaken out of the package before it is intended to be used.

Preferably, the bait cup is provided with portions which help position the cup in the housing and which form barriers leading to the bait cup opening. The barriers further limit the possibility of bait escaping out of the housing, while the rodent can simply climb over the barrier to reach the bait cup entry.

As another feature of the invention, a fluid dispenser is mounted in the housing wall above the bait cup so that when the bait station is to be used, fluid may be dispensed onto the bait to freshen it. A suitable fluid can be applied to the bait which will react with the bait to make it more attractive to the rodent, or the fluid itself may attract the rodent.

Thus, the invention provides an inexpensive yet reliable product that satisfies safety regulations.

DESCRIPTION OF THE DRAWINGS

FIG. 1 is a perspective view of the exterior of the rodent feed station of the invention;

FIG. 2 is an enlarged perspective view of the feed station with the housing partially cut away to illustrate the interior and with the entrance hole covers spaced away from the main structure to illustrate the path that a rodent follows to reach his bait;

FIG. 3 is an exploded perspective view illustrating all the components of the feed station;

FIG. 4 is a fragmentary view illustrating the shape of the rodent entry hole;

FIG. 5 is an elevational view showing detail of the door for the rodent entrance hole.

DESCRIPTION OF THE PREFERRED EMBODIMENT

Figure 6:
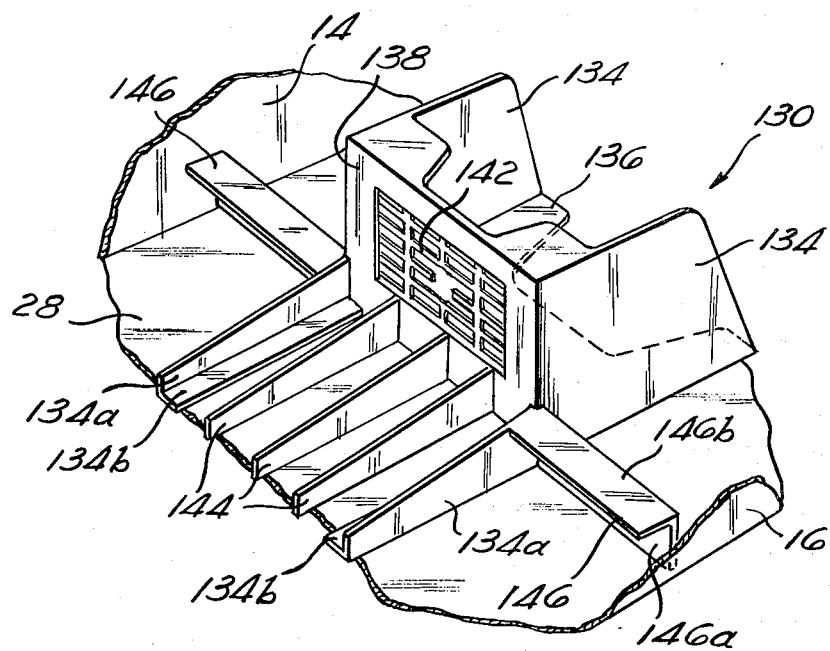
FIG. 6 is a perspective view of an alternative form of bait cup having additional struts and baffle elements for preventing bait from escaping from the feed station.

Referring to FIGS. 1, 2 and 3, the rodent feed station may be seen to include a main housing 10 having a generally flat, horizontal upper wall 12 with a plurality of depending side walls forming a generally rectangular cross-section including spaced, generally parallel walls 14 and 16 joined by spaced walls 18 and 20. At the bottom or lower edge of the side walls is a first outwardly extending flange 22, a short vertical wall 23 and a second peripheral flange 24. The housing 10 is preferably formed as a one-piece unit of light-weight, semi-rigid plastic such as high impact polystyrene. With such material, the housing can be inexpensively manufactured by vacuum forming, the side walls being slightly tilted from vertical to facilitate this forming process.

The housing flange 22 and vertical wall 23 form a recess 26 sized to mate with a flat plastic sheet 28 which becomes the bottom wall of the enclosure formed. The sheet 28 is flush with the flange 24, and it is preferably sonically welded in place so that it is impossible to remove the sheet without major force and tools. This prevents the possibility of inadvertent or improper access to the interior of the housing.

The housing wall 18 is generally flat except that it includes a central section 18a which extends outwardly beyond the face of the remainder of the wall, with the outwardly formed recess extending from the bottom to the top of the wall. Referring to FIG. 2, the opposite wall 20 includes an outwardly extending recess 20a which extends about the same wall width as the recess 18a; however, the recess 20a extends only from the bottom sheet 28 a short distance.

Positioned within the housing 10 is a bait cup 30 having a pair of spaced, parallel vertical walls 32 and 34 which are joined at the lower end by a partial wall 36 and joined at one edge by a vertical wall 38. The forward edges of the vertical walls 32 and 34 fit within the edges of the recess 18a. These vertical walls also include extension portions 32a and 34 which extend across the width of the housing 12 and the outer ends of the extensions fit within the edges of the recess 20a. Thus, the recesses 18a and 20a essentially position the bait cup 30 within the housing and form a bait compartment, without any need for fasteners, etc. The vertical walls 32 and 34 extend to the upper wall 12 of the housing so that there is no access to the interior of the bait cup through these walls. The rear wall 38 includes a large central opening such that the wall is more in the nature of a frame. This opening is covered by a screen or net 42, which is secured to the wall 38. This screen is preferably an integral part of the bait cup and is injection-molded as one unit. This minimizes product costs and has greater likelihood of being defect free. A quantity of bait 44 is positioned in the bait cup 30.

The housing walls 14 and 16 are each provided with an opening 46 which forms a doorway for rodents to enter the trap housing. These openings are axially aligned with each other, and one faces the bait cup wall 32 while the other faces the bait cup wall 34. These openings are initially closed by removable safety plugs or doors 48. As may be seen, each opening 46 includes a pair of diametrically-spaced recesses 46a, as well as a flat chord-like portion having a small notch 50 formed in that portion. The safety doors 48 are disc-like but include an inner portion 48a of one diameter having a pair of diametrically opposed, outwardly extending locking tabs 48b. This inner portion 48a is sized to just fit within the housing wall opening 46 while the tabs 48b fit within the recesses 46a of the opening.

Each of the doors further includes an outer portion 48c which has a diameter larger than the inner portion and larger than the hole 46 in the housing. This outer portion includes a pair of recesses 48d which are aligned with the tabs 48b on the inner portion 48a. One of these recesses includes an outwardly extending protuberance 48e. There is little or no axial gap between the tabs 48b of the inner portion and the outer flange on the outer portion 48c. The outer portion includes a slot 52 for receiving a coin or a screwdriver, with the slot being aligned with the tabs 48b of the inner portion.

When the plug is installed in the opening, the tabs 48b are aligned with the recesses 46a of the opening 46 as shown in FIG. 2, and the plug is then rotated 90° by inserting a coin or a screwdriver into the outer slot 52. During this rotation, there is frictional engagement between the tabs 48b of the inner door portion and the outer flange of the outer door portion 48c with the thin housing wall 14 or 16. When the door is rotated 90°, the protuberance 48e on the outer portion snaps into the recess 50 of the door opening, thus locking the door in the opening. Provision is made (see FIG. 2) for these doors once removed to be stored alongside the mouse entry holes by snap fitting a button 51 on the door into a small hole 53. Thus if the mouse is stopped, the consumer may reclose the bait station or reinstate total closure prior to reuse.

The upper wall 12 of the housing is formed with a small dispenser 54 which contains a liquid for moistening the bait 44 in the bait cup 30. This dispenser, as shown in FIG. 3, includes a pair of mating, shallow, cup-like resilient members which are clamped together by a ring 55 to form a small chamber in which the attractant is positioned. This dispenser is positioned in a recess 56 in the upper wall 12 of the housing. A small opening (not shown) is formed in the bottom wall of the dispenser so that fluid may be dispensed by depressing the upper wall 54.

Also formed in the upper wall 12 are a pair of windows 60 for viewing the bait cup wall 38 near the central part of the housing.

When the feed station is to be used, the doors 48 are removed from the pair of openings in the housing, and stored adjacent to the openings, the upper wall of the dispenser 54 is depressed a few times causing attractant to drip onto the bait 44 in the bait cup 30, and the feed station is then positioned in an area the rodents have been frequenting. When a mouse or other rodent approaches the housing, it can smell the bait but cannot actually reach it without entering the housing. To reach the bait, the rodent must follow the path indicated by the arrows in FIG. 2. After the rodent enters one of the openings 46, it must step over the bait cup wall extension 34a to reach the window leading to the bait. The net 42 covering the window can be chewed away by the rodent, thus allowing the rodent to reach the poison bait 44. The bait will preferably include a slow killing anticoagulant. Thus the rodent will always leave the housing before dying, so that a large number of rodents may be poisoned by the single feed station.

It should be noted that the rodent cannot reach the bait until the netting is chewed away; thus, the bait cannot escape until the feed station is to be used. If some of the bait should then fall out of the bait cup, the bait is still confined by the extensions 32a and 34a of the bait cup walls. Further, if bait should somehow get over these wall extensions, it still cannot easily get out of the trap in that the hole 46 through which the rodent enters the housing is also spaced upward slightly from the bottom wall 24 so that a lip is formed to restrict bait from being removed from the feed station.

After the feed station has been in position for a few days, it can be inspected and the quantity of bait remaining checked by looking through the viewing windows. If bait still remains, it may be freshened by depressing the attractant dispenser a few times. Once the bait is all consumed, it is intended that the entire feed station be discarded since it is relatively inexpensive. However, when all mouse activity ceases, the feed station can be reclosed with stored doors and either saved or reused. With either approach, the user never has to touch the bait, and there is no bulk supply of bait elsewhere presenting a hazard. Typically, bulk supplies are in a cardboard box that must be carefully stored to prevent a hazard.

FIG. 6 illustrates an alternative form of bait cup 130 which may be employed instead of the bait cup 30 illustrated in FIGS. 2 and 3. The bait cup 130 is similar to cup 30 in that it has side walls 134, a bottom wall 136 and a front wall 138 having a window covered by a breakable netting 142. The side walls 134 also have extensions 134a that extend to the opposite wall of the housing. However, for additional strength, these extensions include bottom wall portions 134b that create an angled cross section. In addition, a pair of prong-like elements 144 extend from the front wall 138 of the bait cup essentially parallel to and spaced from the extensions 134a, as may be seen from FIG. 6.

The bait cup 134 is further provided with a pair of struts or wings 146 that extend laterally outwardly from the side walls 134, approximately aligned with the front wall 138. As may be seen, these wings have an angled or L-shaped cross section formed by a vertical portion 146a which engages the bottom wall of the housing, and a horizontal portion 146b attached to the upper end of the vertical portion and extending in the direction of the path to the access window of the bait cup.

The primary purpose for the prongs 144, as well as the wings 146 is to minimize the possibility of bait from escaping from the feed station. When a mouse chews away the netting covering the window, some of the dry bait pellets are likely to fall out of the bait cup. There is then some possibility that a mouse may kick or carry some pellets away from the window area. The prongs 144 form short vertical barriers to prevent the bait pellets from being moved away. Additionally, if the pellets escape the area between the two prongs 144, they may then be blocked by the side wall extensions 134a. Finally, if some pellets should get carried or kicked over the side wall extensions 134a, they are further restricted by the wings 146. Also, the upper horizontal portion 146b of the wings makes it particularly difficult for bait pellets to get over the wings and actually reach the outlets from the bait station. Thus, there is a series of barriers to help contain the bait within the feed station. The wings 146 further serve to strengthen the bait cup structure and help position it laterally within the surrounding housing. It should also be noted that the bait cup with the additional elements shown can still be molded as a single unit to thus keep the cost of manufacture to a minimum.

I claim:

1. A rodent feed station comprising:
    a housing having an upper wall and four depending side walls;
    a flat sheet cooperating with the housing to form an enclosure, with the sheet being the bottom wall of the enclosure;
    a bait cup positioned within said housing cooperating with said housing to form a compartment for rodent bait, said cup including a pair of spaced opposing walls extending from said bottom wall to the upper wall of said housing, an adjacent first side wall of said housing including recess means for receiving and positioning one side edge of each of said cup walls, said cup walls further including portions which extend across said housing to fit within recess means in a second side wall of said housing spaced from said first side wall;
    said housing having a third wall extending between the first and second housing side walls, with the third wall having a hole formed therein to permit a rodent to enter the housing, one of said cup walls being spaced inwardly from said housing third side wall facing said hole so that the bait compartment is not directly accessible through the hole; and
    a window in a third side wall of the bait cup between said cup wall portions to permit access by the rodent to the bait in the compartment.

2. The feed station of claim 1 wherein said housing is formed of a single cup-shaped unit of light-weight, semi-rigid plastic, and said pair of cup walls are constructed to provide some structural rigidity to the housing.

3. The feed station of claim 1 wherein said cup wall portions engage said bottom wall and extend upwardly a short distance so that the rodent can climb over such portion on its way to the window in the bait cup, but yet said portions form a barrier between said opening and said hole for confining bait that might fall out of the opening.

4. The feed station of claim 3 wherein said housing has a fourth wall extending between said first and second walls spaced from said third wall, and the other of said pair of cup walls being spaced inwardly from and facing said fourth housing wall, and a second hole formed in said fourth housing wall for permitting a rodent to enter the housing, said second hole being located so that direct access to said cup opening is not obtained through said second hole.

5. The feed station of claim 1 wherein the recess means in said housing walls extend to the open lower edge of the housing side walls so that before said bottom sheet is attached to the housing, the bait cup may be simply placed into said housing to fit within the recess means and then be held in place in the housing by the bottom sheet, when the bottom sheet is attached to the housing.

6. The feed station of claim 5 wherein the top and one wall of said bait cup is substantially open so that the housing top and the housing first side wall cooperate with the cup to form said compartment.

7. The feed station of claim 1 including means covering the window to hold the bait within the cup, said covering means being breakable by a rodent to enable the rodent to get at the bait.

8. The feed station of claim 7 wherein said covering means is a plastic netting.

9. The feed station of claim 1 including a door for said housing hole designed to prevent inadvertent opening, said housing hole being generally circular but having a pair of circumferentially extending recesses spaced from each other, said door having a disc-shaped portion which fits within said hole including a pair of outwardly extending, circumferentially spaced, locking tabs which fit within said recesses, said door further having a portion attached to said disc-shaped portion which is larger than said hole and thus limits the extent that the disc-shaped portion may be inserted into the hole, said cover being rotatable to a position wherein said locking tabs are no longer aligned with said recesses but instead engage the housing wall and prevent the cover from being pulled out of said hole.

10. The feed station of claim 9 including frictional means for maintaining the cover in the locked position, comprising a radially extending protuberance formed on said cover which extends radially outwardly further than said cover disc-shaped portion, but extends radially outwardly less than said locking tabs, said lug being circumferentially aligned with one of said locking tabs, and said lug being located on the side of said one locking tab which faces said outer cover portion whereby said lug will provide frictional interference when said cover is rotated to prevent the cover from inadvertently rotating.

11. The feed station of claim 10 including means defining a notch in the housing wall portion forming said hole, said notch being circumferentially offset with respect to said recesses and being sized to receive said protuberance when the cover is rotated to the locked position so that the protuberance fits within the notch to hold the cover in the locked position.

12. The feed station of claim 1 including fluid dispenser means mounted in the upper wall of said housing to dispense fluid into said cup to freshen the bait when the feed station is to be used.

13. The feed station of claim 12 wherein said fluid dispenser includes a chamber formed by flexible material which may be depressed to squeeze fluid out of said dispenser into said cup.

14. A rodent feed station comprising:
a housing made of light-weight, semi-flexible plastic, said housing having a flat upper wall and four depending side walls having a generally rectangular cross-section with an outwardly extending flange formed on the lower edge of the side walls;
a flat sheet secured to said housing flange to form an enclosure in cooperation with said housing, with the sheet forming the bottom wall of the enclosure;
one of said housing side walls having a hole formed therein to permit a rodent to enter the enclosure, a second one of said housing side walls parallel to said first wall having a hole formed therein for permitting a rodent to enter the enclosure, said holes being approximately axially aligned;
a bait cup positioned within said housing spaced inwardly from each of said holes, said bait cup including a pair of spaced parallel walls that extend from the bottom wall of the housing to the upper wall of the housing, said cup walls being parallel to said housing first and second walls and being aligned with said holes to block a direct path from one hole to the other hole, said cup being open on its upper end so that a portion of said housing upper wall cooperates with the cup walls to form the upper wall of a bait compartment, said housing having a third wall extending between said first and second walls and having recess means to receive the edges of said cup walls to properly position the cup in said housing, said cup being open on the side facing the third housing wall whereby a portion of said third housing wall between said cup walls cooperates with said cup to form a wall of the bait compartment, said cup walls including portions which engage the bottom wall of the housing and extend across the housing to a fourth wall of the housing which is spaced from and parallel to the third housing wall, said fourth wall including recess means adjacent the housing bottom sheet to receive and position ends of said cup wall portions, said cup further including a third wall extending between said pair of cup walls spaced from and parallel to said housing third and fourth walls, means forming a window in said third wall to permit access to interior of the bait compartment by a rodent, the cup portions which extend from said cup third wall to said housing fourth wall extending only partially upward toward said housing upper wall to form barriers for bait which might fall out of said bait compartment through said window, there being sufficient space between said barriers and upper wall of said housing to permit a rodent to reach said window; and
tamper-proof covers for said housing holes, to be removed when the feed station is to be used.

15. The feed station of claim 14 including fluid dispenser means mounted in the upper wall of said housing between the grooves in the upper wall to dispense fluid downwardly into said bait cup to freshen the bait when desired.

16. The feed station of claim 14 wherein said window is covered by a means which retains the bait within said compartment, said means being made of material which can be readily chewed away or broken by a rodent to permit the rodent to obtain access to bait in said compartment.

* * * * *